United States Patent [19]
Maruoka et al.

[11] Patent Number: 6,106,656
[45] Date of Patent: Aug. 22, 2000

[54] METHOD FOR THE PRODUCTION OF A HOLLOW GOLF BALL

[75] Inventors: Kiyoto Maruoka, Kobe; Akihiro Nakahara, Ibaragi; Kazuo Hochi, Amagasaki; Kazuhisa Fushihara, Kakogawa; Yutaka Yoshida, Kobe, all of Japan

[73] Assignee: Sumitomo Rubber Industries, Ltd., Hyogo-ken, Japan

[21] Appl. No.: 08/997,593

[22] Filed: Dec. 23, 1997

[30] Foreign Application Priority Data

Jan. 7, 1997 [JP] Japan ..................................... 9-000574
Oct. 28, 1997 [JP] Japan ..................................... 9-295283

[51] Int. Cl.⁷ ............................. B29C 33/40; B29C 35/02
[52] U.S. Cl. ........................................... 156/292; 156/145
[58] Field of Search ..................................... 156/292, 145

[56] References Cited

U.S. PATENT DOCUMENTS 1,575,388  3/1926  Roberts ..................................... 156/245
3,933,967  1/1976  Taylor ....................................... 264/248

FOREIGN PATENT DOCUMENTS 187876  8/1986  Japan .

*Primary Examiner*—Francis J. Lorin

[57] ABSTRACT

The present invention provides a method for the production of a hollow golf ball, which has a perfect spherical hollow portion and possesses excellent durability and good shot feel at the time of hitting, without adversely affecting a good rebound performance. The present invention provides a method for producing a hollow golf ball comprising a hollow core (5) having a hollow center (2) and a hollow portion (1) and, optionally, at least one intermediate core layer (3) formed on the hollow center (2), and a cover (4) formed on the hollow core (5), wherein the step of producing the hollow center (2) comprises:

(i) preparing a rubber composition for hollow center;

(ii) forming a bowl-shaped half-shell from the rubber composition for the hollow center and vulcanizing only the inside of the half-shell; and (iii) bonding two of the half-shells together to form a complete sphere body which is then vulcanized to obtain the hollow center (2).

19 Claims, 4 Drawing Sheets

6,106,656

METHOD FOR THE PRODUCTION OF A HOLLOW GOLF BALL

FIELD OF THE INVENTION

The present invention relates to a hollow golf ball, and a method for the production of the same. More particularly, the present invention relates to a method for producing a hollow golf ball, which has a perfect spherical hollow center and has excellent durability and good shot feel at the time of hitting, without adversely affecting good rebound performance.

BACKGROUND OF THE INVENTION

A golf ball, especially a spherical rubber core of a golf ball is generally produced by a method wherein a rubber composition for the core is inserted into a semispherical mold and covered with another semispherical mold, followed by heating under pressure. It is also suggested to make a core two-layered. The two-layered core is generally prepared by a method wherein a center is formed by vulcanizing a rubber composition and then a bowl-shaped half-shell is separately formed from a rubber composition by molding under pressure at a temperature which does not cause vulcanization, using a half-shell mold and a core mold, followed by inserting the vulcanized center into the bowl-shaped half-shell, covering another bowl-shaped half-shell, and vulcanizing by heating under pressure. A hollow thread wound golf ball has also been proposed which is prepared by winding thread rubber on a hollow iron sphere in a stretched condition and then covering with a cover resin (Japanese Patent Kokai Publication No. 18787/198).

The rebound characteristics of golf balls have been remarkably improved these years by attaining a high launch angle and reducing the spin amount. However, shot feel at the time of hitting is desired to be more improved, because golf balls which have been commercially available do not meet golfers' satisfaction in shot feel. In order to improve the shot feel, it has been suggested to make a golf ball with a hollow center. However, it is a difficult technique to mold vulcanized rubber into a hollow sphere. Particularly, when a core of the hollow golf ball is produced either by pressmolding in a core mold shown in FIG. 5 or by injection-molding to form a bowl-shaped half-shell followed by vulcanizing two of the bowl-shaped half-shells in a mold shown in FIG. 6, the resulting hollow portion can be easily broken by the expansion of the rubber composition and does not form a perfect spherical shape and thus provides much distribution in the thickness of the core wall. It has also been suggested that two bowl-shaped half-shells can be obtained by vulcanizing the rubber composition and then adhering the shells to each other by an adhesive agent etc. to form a hollow core. However, the hollow core has a defect in its durability because the hollow core often breaks at the adhesive surface by the very strong impact force created at the time of hitting the golf ball with a golf club.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

OBJECT OF THE INVENTION

Figure 1:
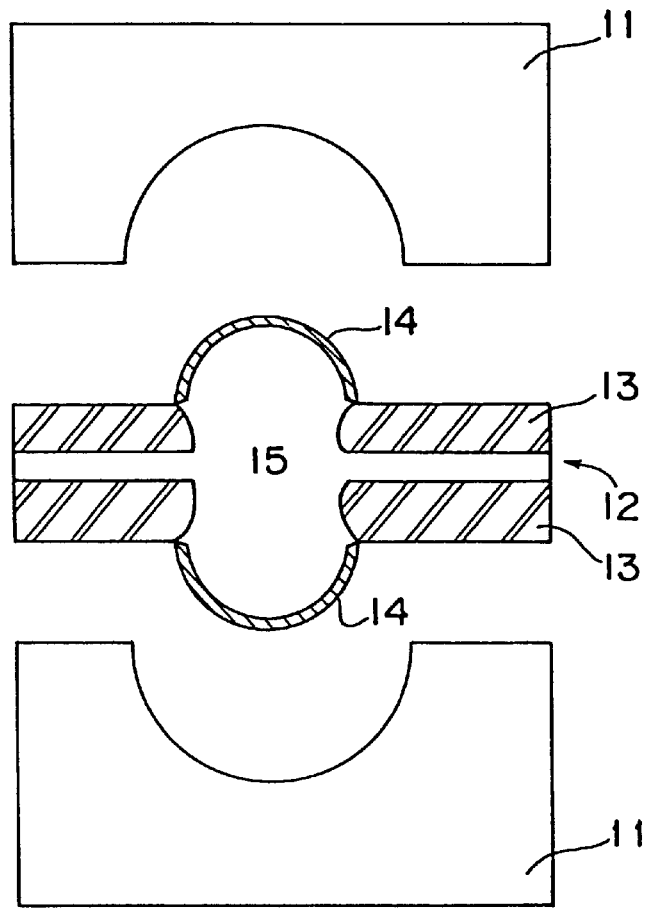
FIG. 1 is a schematic, sectional view illustrating a mold used in the method for the production of a hollow golf ball of the present invention.

An object of the present invention is to solve the above problems encountered with conventional methods and to provide a method for producing a hollow golf ball which has a perfect spherical, hollow center portion and has excellent durability and good shot feel at the time of hitting without adversely affecting good rebound performance.

SUMMARY OF THE INVENTION

The present inventors have found that by the preliminary vulcanizing of only the inside of the rubber composition of the core between a semispherical mold and a core mold in a method for the production of a solid golf ball, a hollow golf ball can be obtained which has a perfect spherical hollow portion and has excellent durability and improved shot feel at the time of hitting, without adversely affecting good flight performance.

That is, the present invention provides a method for producing a hollow golf ball comprising a hollow core (5) comprising a hollow center (2) having a hollow (1) in its center and, optionally, at least one intermediate core layer (3) formed on the hollow center (2), and a cover (4) formed on the hollow core (5), wherein the step of producing the hollow center (2) comprises:

(i) preparing a rubber composition for the hollow center;
(ii) forming a bowl-shaped half-shell from the rubber composition for the hollow center and vulcanizing only the inside of the half-shell; and
(iii) bonding two of the half-shells together to form a complete sphere body which is vulcanized to obtain the hollow center (2).

DETAILED DESCRIPTION OF THE INVENTION

The method for production of the hollow golf ball of the present invention will be described in detail with reference to the accompanying drawings. FIG. 1 is a drawing which schematically illustrates a cross section of a mold used in the method for the production of a hollow golf ball according to the present invention. As shown in FIG. 1, a rubber composition is inserted between a semispherical mold (11) and a core mold (12) which has a low thermal conductivity portion (13), a metal thin plate (14) and a core hollow portion (15). Only the inside of the rubber composition is vulcanized by heating the portion of the metal thin plate (14), and then the core mold (12) is removed to form a bowl-shaped half-shell of which only the inside, i.e. hollow portion, is vulcanized. Two of the resulting bowl-shaped half-shells are unified to form a sphere and placed together in two semispherical molds (11) forming a mold of FIG. 6, followed by vulcanizing to form a hollow center. The bowl-shaped half-shell wherein only the hollow portion side is vulcanized means that only the hollow portion side (inside) is vulcanized and the outer side portion around the hollow portion side is semi-vulcanized or remains unvulcanized. As described above, at the same time when a rubber composition is molded into a predetermined shape, the vulcanization of the inside of the bowl-shaped half-shell can be vulcanized. Alternatively, a rubber composition is preliminarily molded into a bowl-shaped half-shell and thereafter the hollow portion may be vulcanized by bringing a heated mold into contact with the hollow portion side of the bowl-shaped half-shell.

When the bowl-shaped sphere is produced, the temperature of the semispherical mold (11) of FIG. 1 may be from 80 to 130° C., preferably from 110 to 120° C., and the material of the semispherical mold is preferably a metal. The material of low thermal conductivity (13) can be a resin having the heat resistance and low thermal conductivity of ceramics. Preferred are Teflon, polyacetate and the like. The metal thin plate (14) is formed from metal. In FIG. 1, the core hollow portion (15) shows a hollow portion inside the metal thin plate (14). In order to heat only the metal thin plate (14), a heating wire (16) may be provided at the back side of the metal thin plates (14). The heating wire can be heated by applying electric current. The vulcanization of the inside of the bowl-shaped half-shell is performed at a temperature of the portion (14) of 140 to 170° C. for 10 to 20 minutes.

As described above, after the core mold (12) is removed, two bowl-shaped half-shells are bonded with each other and then entirely vulcanized between the two semispherical molds (11). The entire vulcanization is performed at a temperature of 140 to 170° C. for 10 to 20 minutes.

Figure 6:
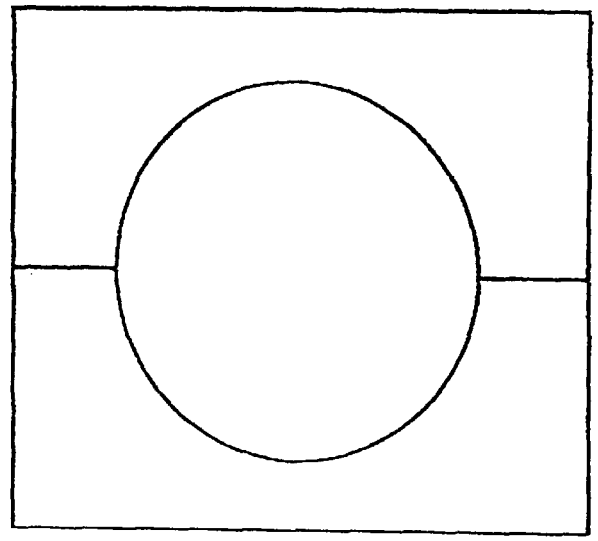
FIG. 6 is a schematic, sectional view illustrating a mold used in the method for producing the hollow golf ball of the present invention.
Figure 7:
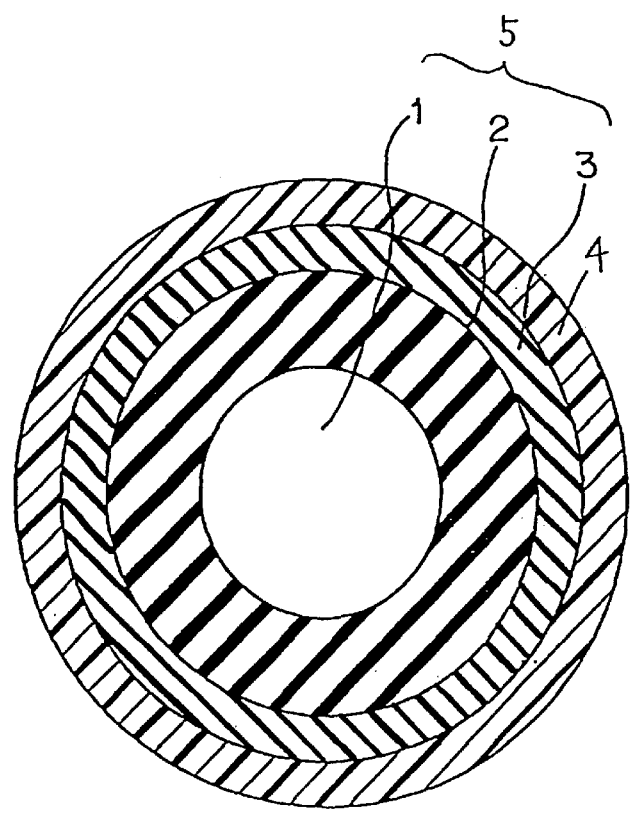
FIG. 7 is a schematic, sectional view illustrating one embodiment of the hollow golf ball of the present invention.

A hollow center is formed by putting the resulting two bowl-shaped half-shells together in the form of a sphere and vulcanizing the portion other than the hollow portion in a mold as shown in FIG. 6. The bowl-shaped half-shell is not obtained by cutting the hollow center into two equal parts. However, it is preferred that the bowl-shaped half-shell preferably has a shape obtained by equally cutting the hollow center into two parts. This is because, in case of cutting into two equal parts, only one kind of a mold for producing a bowl-shaped half-shell is necessary and only one kind of the bowl-shaped half-shell for producing a hollow center can be stored and, therefore, the productivity is improved.

The rubber composition used in the hollow center contains a base rubber, a co-crosslinking agent, a crosslinking agent, a filler and the like. The base rubber can be natural rubber, a synthetic rubber, or a mixture thereof, which have hitherto been used for solid golf balls. Examples of the synthetic rubbers are polybutadiene rubber, polyisoprene rubber, styrene-polybutadiene rubber, ethylene-propylene-diene rubber (EPDM) and the like. Particularly, a so-called high-cis polybutadiene rubber having cis-1,4 structure of at least 40%, preferably 80% or more is preferable. In order to impart high rebound characteristics, the base rubber occupies at least 70 wt %, preferably at least 80 wt % in the rubber composition.

Examples of the co-crosslinking agents are metal salts of unsaturated carboxylic acids, particularly monovalent and divalent metal salts (e.g. zinc salt, magnesium salt, etc.) of α,β-unsaturated carboxylic acids having 3 to 8 carbon atoms (e.g. acrylic acid, methacrylic acid, etc.). In order to impart high rebound characteristics, zinc acrylate is preferably used in the present invention. An amount of the co-crosslinking agent may be within the range of from 15 to 50 parts by weight, preferably from 25 to 35 parts by weight, based on 100 parts by weight of the base rubber. When the amount of the co-crosslinking agent is larger than 50 parts by weight, the center is too hard and, therefore, the shot feel is poor. On the other hand, when the amount is smaller than 15 parts by weight, the rebound characteristics are poor and, therefore, the flight distance decreases.

The crosslinking agent is known to the art in the filed of golf balls and includes organic peroxides, such as dicumyl peroxide, 1,1-bis(t-butylperoxy)-3,5-trimethylcyclohexane, 2,5-dimethyl-2,5-di(t-butylperoxy)hexane, di-t-butyl peroxide and the like. Among them, dicumyl peroxide is preferable. The amount of the crosslinking agent blended may be within the range of from 0.1 to 3 parts by weight, preferably from 0.5 to 2.0 parts by weight, based on 100 parts by weight of the base rubber. When the amount is smaller than 0.1 parts by weight, the center is too soft and, therefore, the rebound characteristics are poor and flight distance decreases. On the other hand, when it exceeds 3 parts by weight, the shot feel is poor.

The filler may be any one which is generally blended in the core of the golf ball, and examples thereof are inorganic fillers (e.g. zinc oxide, barium sulfate, calcium carbonate, etc.), high-specific gravity metal powders (e.g. tungsten powder, molybdenum powder, etc.) or a mixture thereof. The hollow core used in the present invention exhibits a lack in weight compared with a solid core without a hollow portion. Therefore, a mixture of the inorganic filler with a high-specific gravity is preferably used.

The hollow core (5) may be only composed of a hollow center (2), but at least one intermediate core layer (3) may be provided on the hollow center. When using the intermediate core layer (3), the same rubber composition as that used in the production of the above hollow center can be used. By providing the intermediate core layer (3), it is possible to use different rubber compositions in the inner side and outer side of the hollow core and it is also possible to perform various adjustments for improving the shot feel and rebound characteristics of the resulting golf ball. Since the expansion of the rubber composition at the time of vulcanization becomes larger as the thickness of the rubber composition increases, the thickness of the hollow center can be decreased compared with the case of forming the hollow core with only the hollow center. Accordingly, there is a technical effect of further preventing the deformation of the hollow center or hollow portion caused by the expansion of the rubber composition in the step of bonding two bowl-shaped half-shells, wherein only the hollow portion side is vulcanized, and then vulcanizing the entire hollow center in the method for the production of the hollow golf ball of the present invention. To the contrary, when the hollow core is only composed of the hollow center, the number of production steps is small and the productivity is better.

A diameter of the hollow portion is not specifically limited, but is preferably from 5 to 30 mm, more preferably from 10 to 25 mm. When the diameter of the hollow portion is larger than 30 mm, the deformation at the time of hitting of the resulting golf ball is too large and, therefore, energy loss is larger and rebound characteristics are deteriorated. It is also necessary to use a large amount of the filler in the core rubber layer so as to adjust the specific gravity, which, however, may reduce the rebound characteristics. When the diameter of the hollow portion is smaller than 5 mm, it is impossible to sufficiently attain the technical effects obtained by forming the hollow portion, such as the enhancement of the moment of inertia of the golf ball, the improvement of shot feel and the like.

A thickness of the hollow core, including the thickness of the hollow center, is preferably from 4.0 to 18 mm. When the thickness of the hollow core is smaller then 4.0 mm, the thickness of the cover is too large or the diameter of the hollow portion is too large. When the thickness of the cover is too large, the shot feel is deteriorated, as described above. When the diameter of the hollow portion is too large, the rebound characteristics deteriorate, as described above. The thickness of the hollow core, including the thickness of the hollow center, is preferably not less than 6 mm, more preferably not less than 7 mm. When the thickness of the hollow core is larger than 18 mm, the thickness of the cover is small or the diameter of the hollow portion is small. When the thickness of the cover is too small, the durability is deteriorated, as described above. When the diameter of the hollow portion is too small, it is impossible to sufficiently attain the technical effects obtained by providing the hollow portion, such as the enhancement of the moment or inertia and the improvement of shot feel, as described above. The thickness of the hollow core, including the thickness of the hollow center, is preferably not more than 15 mm.

When the hollow core (5) is composed of the core center (2) and the intermediate core layer (3), a wall thickness of the hollow center is preferably from 4.0 to 12.5 mm. When the wall thickness of the hollow center is smaller than 4.0 mm, the hollow center is liable to deform in the step of covering the intermediate rubber layer on the hollow center. It is also difficult to keep the outer portion semi-vulcanized or unvulcanized by vulcanizing only the inside of the bowl-shaped half-shell. Accordingly, when using such a bowl-shaped half-shell having a thin wall, it is difficult to perform vulcanization by putting two of the bowl-shaped half-shells together. Therefore, the thickness of the hollow center is preferably not less then 5.0 mm, more preferably not less than 6.0 mm. When the wall thickness of the hollow center is larger then 12.5 mm, in the step of bonding the two bowl-shaped half-shells having the vulcanized hollow portion together and then vulcanizing them to produce a hollow center, the expansion of the rubber caused by the vulcanization is large and the hollow center will deform. In order to improve the sphericity of the hollow portion, the thickness of the hollow center is not more then 10 mm, preferably no less than 8.0 mm.

Then, a cover is placed on the hollow core. The cover can be formed from an ionomer resin or a balata which is generally used as a cover material of the solid golf ball. A small amount of other resins may be added to the ionomer or balata. The ionomer resin can be those prepared by neutralizing a portion of carboxylic acids of a copolymer or ethylene (meth)acrylate with metal ion, or a mixture thereof. Examples of the metal ion for neutralization are alkali metal ion such as NA ion, K ion, Li ion, etc.; divalent metal ion such as Zn ion, Ca ion, Mg ion, etc.; trivalent metal ion such as Al ion, Nd ion, etc.; and a mixture thereof. Among them, Na ion, Zn ion, Li ion, etc., are often used in view of rebound characteristics, durability, etc. Specific examples of the ionomer resin are Hi-milan 1557, 1605, 1652, 1705, 1706 1707, 1855 and 1856 (manufactured by Mitsui Du Pont Polychemical Co.); and IOTEC 7010 and 8000 (manufactured by Exxon Co.), but are not limited thereto.

The cover resin composition may contain other additives such ultraviolet absorbers, photostabilizers, and fluorescent agents or fluorescent whiteners, fillers (e.g. barium sulfate, etc.) and colorants (e.g. titanium dioxide, etc.), so far as the desired characteristics obtained by the golf ball cover are not adversely affected. An amount of the colorant is preferably from 0.1 to 5.0 parts by weight.

The cover in the present invention can be formed by using a generally known method used in the formation of the cover of a golf ball, for example, injection molding, press molding, etc. At the time of covering the cover, a lot of recesses referred to as "dimples" are optionally formed on the surface. The golf ball of the present invention is put on the market after coating with paint to enhance appearance and commercial value. A thickness of the cover is from 1 to 4 mm. When the thickness is smaller than 1 mm, the strength of the cover is insufficient and the durability of the resulting golf ball is deteriorated. Therefore, the thickness is preferably not less than 1.5 mm. On the other hand, when the thickness exceeds 4 mm, the shot feel of the resulting golf ball is poor and, therefore, the thickness is not more than 3 mm, more preferably. The cover may be composed of two or more layers.

The present invention provides a hollow golf ball which has a perfect spherical hollow portion at its center and has excellent durability and improved shot feel at the time of hitting, without adversely affecting good rebound performance.

EXAMPLES

The present invention will be illustrated by the following Examples which do not limit the present invention.

Example 1
Production of a Hollow Core

Figure 3:
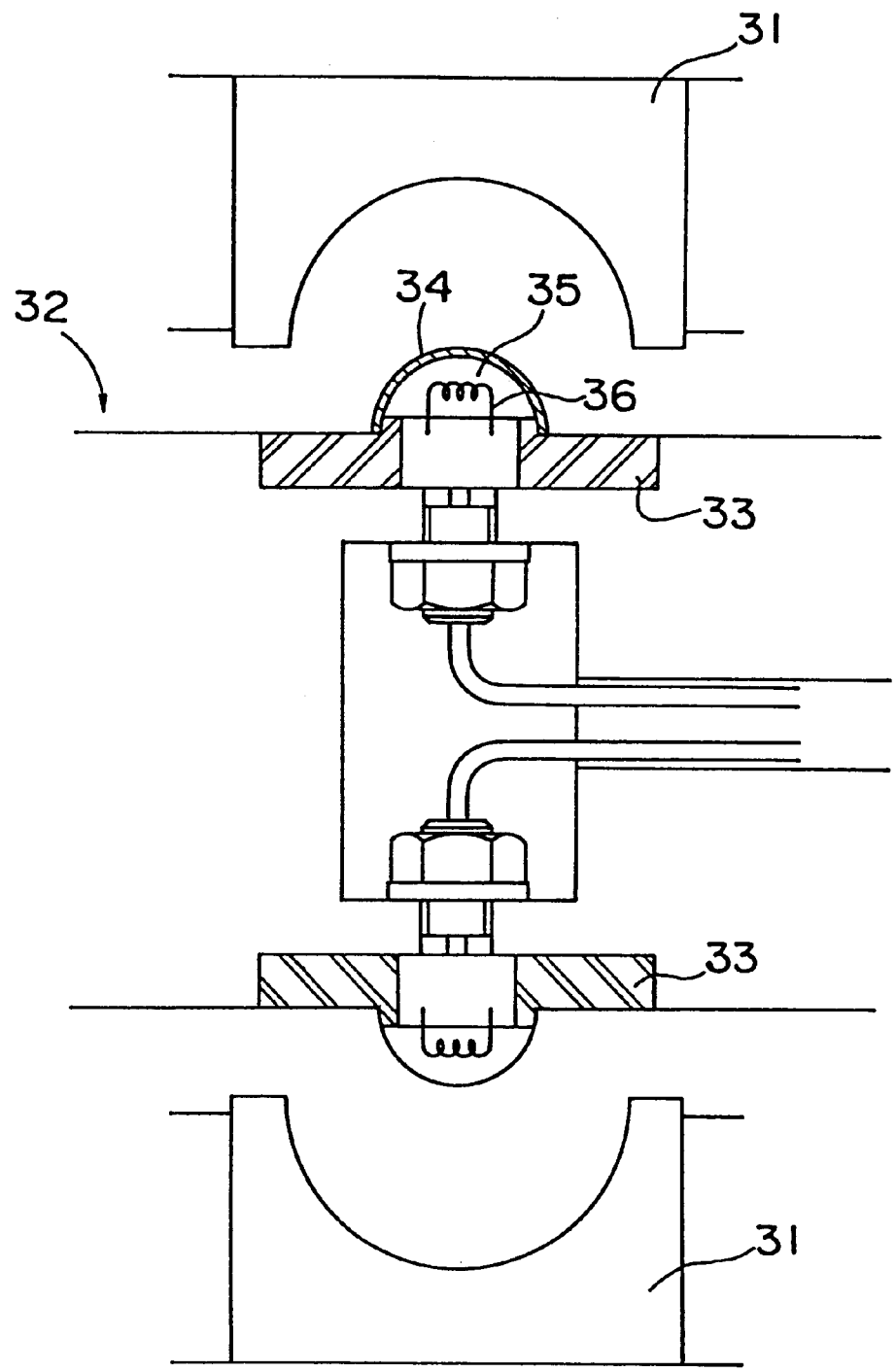
FIG. 3 is a schematic, sectional view illustrating a preferred embodiment of a mold used in the method for producing a hollow golf ball according to the present invention.

A bowl-shaped half-shell, of which only the inside was vulcanized, was produced from a rubber composition of the formulation A shown in Table 1, using a semispherical mold (31) and a core mold (32) as shown in FIG. 3. The semispherical mold (31) was made of iron, and was heated under pressure by using a compression vapor press. In the core mold (32), a heater (36) was placed in a metal thin plate (34). A low thermal conductivity portion (33) was made of Teflon and was capable of heating only the metal thin plate (34) by applying electric current, and was capable of vulcanizing only the inside of the bowl-shaped half-shell. A bowl-shaped half-shell having a rubber thickness of 11.7 mm and an outer diameter of 38.4 mm was produced by inserting the above formulation between the semispherical mold (31) and the core mold (32), followed by vulcanizing at a press temperature of 120° C. and a metal thin plate temperature of 160° C. for 15 minutes. After the core mold (32) was removed, the two bowl-shaped half-shells were adhered to each other and then vulcanized at 160° C. for 15 minutes to obtain a spherical hollow center. This spherical hollow center was used as a hollow core.

TABLE 1

|  | Core formulation (Parts by weight) | |
|---|---|---|
| Ingredients | A | B |
| BR-11 (Note 1) | 100 | 100 |
| Zinc acrylate | 31 | 31 |
| Zinc oxide | 20 | 21 |

TABLE 1-continued

| | Core formulation (Parts by weight) | |
|---|---|---|
| Ingredients | A | B |
| Barium sulfate | 22 | — |
| Dicumyl peroxide | 1.5 | 1.5 |

The resulting hollow core was covered with a cover having the cover formulation shown in Table 2 by injection molding and then coated with two package type urethane paint to obtain a hollow golf ball having a diameter of 43 mm. The outer diameter of the metal thin plate (34), i.e. a diameter of the hollow portion, was 15 mm.

TABLE 2

| Cover formulation | |
|---|---|
| Ingredients | Parts by weight |
| Hi-milan #1605 (Note 2) | 50 |
| Hi-milan #1706 (Note 3) | 50 |
| Titanium dioxide | 2 |

(Note 1): High-cis-1,4-polybutadiene (containing 96% of cis-1,4 structure), manufactured by Japan Synthetic Rubber Co., Ltd.

(Note 2): Ethylene-methacrylic acid copolymer ionomer resin neutralized with sodium ion, manufactured by Mitsui Du Pont Polychemical Co., Ltd.

(Note 3): Ethylene-methacrylic acid copolymer ionomer resin neutralized with zinc ion, manufactured by Mitsui Du Pont Polychemical Co., Ltd.

Comparative Example 1

A spherical core having a diameter of 38.4 mm, which had no hollow portion, was obtained by inserting a rubber composition of the formulation B shown in Table 1 into a mold shown in FIG. 6 without using a core mold (32), followed by vulcanizing at 160° C. for 30 minutes. A solid golf ball was obtained by injection-molding a cover composition of the formulation shown in Table 2 on the resulting core, followed by coating with a two package type urethane paint.

Comparative Example 2

Figure 4:
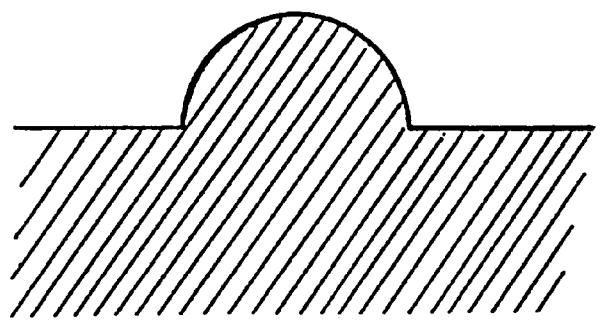
FIG. 4 is a schematic, sectional view illustrating a metal integrated core mold (37) used in Comparative Example 2.

A hollow core having a hollow portion diameter of 15 mm, a rubber thickness of 11.7 mm and an outer diameter of 38.4 mm was obtained by vulcanizing a rubber composition of the formulation A shown in Table 1 at 160° C. for 30 minutes, using a semispherical core (31) and a core mold (37) shown in FIG. 4, and bonding the resulting half-shells with each other using an adhesive. A hollow golf ball having a diameter of 43 mm (the same as that in Example 1) was obtained by injection-molding a cover composition of the formulation shown in Table 2 on the resulting core, followed by coating with a two package type urethane paint.

Example 2

Production of Hollow Center

A bowl-shaped half-shell, wherein only the inside was vulcanized, was produced from a rubber composition of the formulation A shown in the above Table 1, using a semi-spherical mold (31) and a core mold (32) having respectively a predetermined size as shown in FIG. 3. The semispherical mold (31) was made of iron, and can be heated under pressure by using a compression vapor press. In the core mold (32), a heater (36) was placed in a metal thin plate (34). A low thermal conductivity portion (33) was made of Teflon and was capable of heating only the metal thin plate (34) by applying electric current, and was capable of vulcanizing only the inside of the bowl-shaped half-shell. A bowl-shaped half-shell having a rubber thickness of 5 mm and an outer diameter of 25 mm was produced by inserting the above formulation between the semispherical mold (31) and the core mold (32), followed by vulcanizing at a press temperature of 120° C. and a metal thin plate temperature of 160° C. for 3 minutes. After the core mold (32) was removed, two bowl-shaped half-shells were put together and then vulcanized at 160° C. for 10 minutes to obtain a spherical hollow center having a hollow portion diameter of 15 mm and an outer diameter of 25 mm.

Production of Bowl-shaped Half-shell for Intermediate Core Layer

Figure 5:
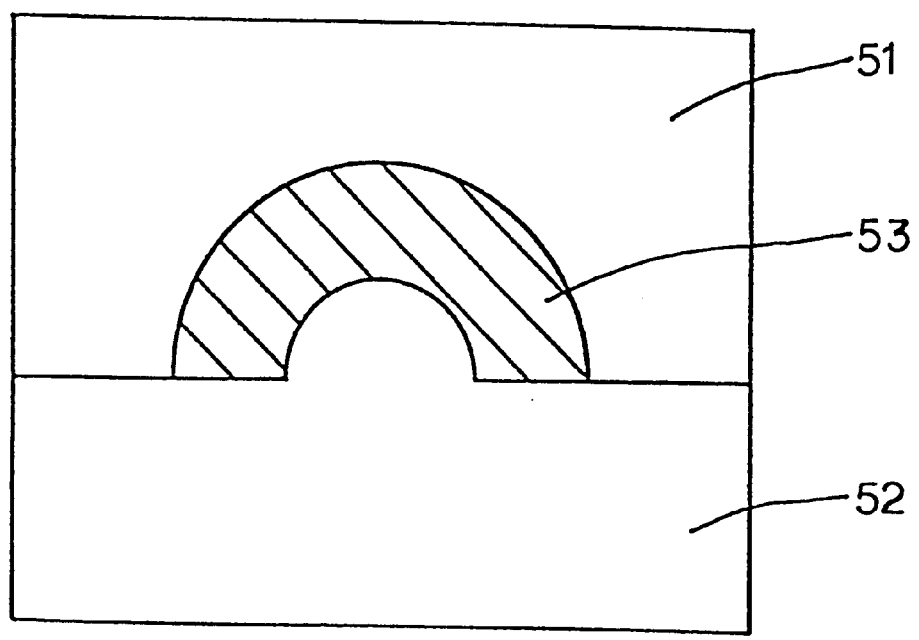
FIG. 5 is a schematic, sectional view illustrating a mold used in the method for producing the hollow golf ball of the present invention.

A bowl-shaped half-shell (53) for forming an intermediate core layer was produced by preliminarily molding a rubber composition of the formulation A shown in the above Table 1 at 160° C. for 2 minutes, using a semispherical mold (51) and a core mold (52) having respectively a predetermined size as shown in FIG. 5.

Production of Hollow Core

The resulting hollow center was put in the resulting two bowl-shaped half-shells for forming an intermediate core layer, which was put in a mold having a predetermined size as shown in FIG. 6 and then vulcanized at 165° C. for 20 minutes to produce a hollow core having a diameter of 38.4 mm and a hollow portion diameter of 15 mm.

The resulting hollow core was covered with a cover material having the cover formulation shown in Table 2 by injection molding and then coated with two package type urethane paint to obtain a hollow golf ball having a diameter of 43 mm. The outer diameter of the metal thin plate (34), i.e. a diameter of the hollow portion, was 15 mm.

Comparative Example 3

Production of Hollow Center

A bowl-shaped half-shell having a rubber thickness of 5 mm and an outer diameter of 25 mm was produced by preliminarily molding a rubber composition of the formulation A shown in the above Table 1 at 160° C. for 2 minutes, using a semispherical mold (51) and a core mold (52) having respectively a predetermined size as shown in FIG. 5. Then, two bowl-shaped half-shells were put together using a mold having a predetermined size as shown in FIG. 6 and vulcanized at 165° C. for 10 minutes to obtain a spherical hollow center having a hollow portion diameter of 15 mm and an outer diameter of 25 mm.

Production of Bowl-shaped Half-shell for Intermediate Core Layer

A bowl-shaped half-shell (53) for forming an intermediate core layer was produced by preliminarily molding a rubber composition of the formulation A shown in the above Table 1 at 160° C. for 2 minutes, using a semispherical mold (51) and a core mold (52) having respectively a predetermined size as shown in FIG. 5.

Production of Hollow Core

The resulting hollow center was put in the resulting two bowl-shaped half-shells for forming an intermediate core layer, which was put in a mold having a predetermined size as shown in FIG. 6 and then vulcanized at 165° C. for 20 minutes to produce a hollow core having a diameter of 38.4 mm and a hollow portion diameter of 15 mm.

The resulting hollow core was covered with a cover material having the cover formulation shown in Table 2 by injection molding and then coated with two package type urethane paint to obtain a hollow golf ball having a diameter of 43 mm. The outer diameter of the metal thin plate (34), i.e. a diameter of the hollow portion, was 15 mm.

Comparative Example 4
Production of Hollow Center

A bowl-shaped half-shell having a rubber thickness of 5 mm and an outer diameter of 25 mm was produced by vulcanizing a rubber composition of the formulation A shown in the above Table 1 at 165° C. for 10 minutes, using a semispherical mold (51) and a core mold (52) having respectively a predetermined size as shown in FIG. 5. Then, two bowl-shaped half-shells were bonded using an adhesive to produce a spherical hollow center having a hollow portion diameter of 15 mm and an outer diameter of 25 mm.

Production of Bowl-shaped Half-shell for Intermediate Core Layer

A bowl-shaped half-shell (53) for forming an intermediate core layer was produced by preliminarily molding a rubber composition of the formulation A shown in the above Table 1 at 160° C. for 2 minutes, using a semispherical mold (51) and a core mold (52) having respectively a predetermined size as shown in FIG. 5.

Production of Hollow Core

The resulting hollow center was put in the resulting two bowl-shaped half-shells for forming an intermediate core layer, which was put in a mold having a predetermined size as shown in FIG. 6 and then vulcanized/pressed at 165° C. for 20 minutes to produce a hollow core having a diameter of 38.4 mm and a hollow portion diameter of 15 mm.

The resulting hollow core was covered with a cover material having the cover formulation shown in Table 2 by injection molding and then coated with two package type urethane paint to obtain a hollow golf ball having a diameter of 43 mm. The outer diameter of the metal thin plate (34), i.e. a diameter of the hollow portion, was 15 mm.

Example 3
Production of Hollow Center

Figure 2:
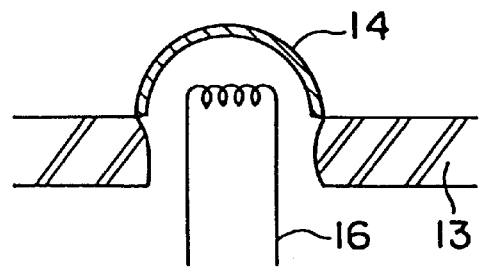
FIG. 2 is a schematic, sectional view illustrating a core mold (12) of the mold used in the method for the production of a hollow golf ball shown in FIG. 1 of the present invention.

A bowl-shaped half-shell having a rubber thickness of 5 mm and an outer diameter of 25 mm was produced by preliminarily molding a rubber composition of the formulation A shown in the above Table 1 at 160° C. for 2 minutes, using a semispherical mold (51) and a core mold (52) having respectively a predetermined size as shown in FIG. 5. Only the hollow portion side of the bowl-shaped half-shell was vulcanized by bringing a heated mold having a predetermined size as shown in FIG. 2 into contact with the surface of the hollow portion side of the bowl-shaped half-shell. After two bowl-shaped half-shells were put together and vulcanized at 165° C. for 10 minutes, the bonded surface was entirely vulcanized by entire vulcanization to obtain a spherical hollow center having a hollow portion diameter of 15 mm and an outer diameter of 25 mm.

Production of Bowl-shaped Half-shell for Intermediate Core Layer

A bowl-shaped half-shell (53) for forming an intermediate core layer was produced by preliminarily molding a rubber composition of the formulation A shown in the above Table 1 at 160° C. for 2 minutes, using a semispherical mold (51) and a core mold (52) having respectively a predetermined size as shown in FIG. 5.

Production of Hollow Core

The resulting hollow center was put in the resulting two bowl-shaped half-shells for forming an intermediate core layer, which was put in a mold having a predetermined size as shown in FIG. 6 and then vulcanized at 165° C. for 20 minutes to produce a hollow core having a diameter of 38.4 mm and a hollow portion diameter of 15 mm.

The resulting hollow core was covered with a cover material having the cover formulation shown in Table 2 by injection molding and then coated with two package type urethane paint to obtain a hollow golf ball having a diameter of 43 mm. The outer diameter of the metal thin plate (34), i.e. a diameter of the hollow portion, was 15 mm.

With respect to the resulting golf balls, the sphericity, rebound coefficient and durability were evaluated. The results are shown in Table 3. The test method was as follows.

(Test method)

(1) Sphericity

A photograph of 100 golf balls obtained as described above is taken by a CAT scan, respectively, and it is evaluated whether the hollow portion has a perfect circle shape. The evaluation criteria are as follows.

Evaluation Criteria:
O: Difference in length between horizontal and vertical sizes is smaller than 1 mm.
Δ: Difference in length between horizontal and vertical sizes is from 1 to 3 mm.
X: Difference in length between horizontal and vertical sizes is larger than 3 mm.

(2) Rebound Coefficient

An iron block (200 g) was hit against a golf ball at rest at a speed of 40 m/s, and the speed of the iron block and that of the golf ball after hitting were measured. Then, the rebound coefficient of the golf ball was calculated from each speed and weight.

(3) Durability

A driver was attached to a swing robot manufactured by True Temper Co. and a golf ball was hit therewith at a head speed of 45 m/second 100 times. The durability was represented by the number of the golf balls broken after the test (total ten golf balls).

(Test results)

TABLE 3

| | Example No. | | | Comparative Example No. | | | |
|---|---|---|---|---|---|---|---|
| Test item | 1 | 2 | 3 | 1 | 2 | 3 | 4 |
| Sphericity (number of golf balls) | | | | | | | |
| O | 100 | 100 | 100 | — | 100 | 0 | 100 |
| Δ | 0 | 0 | 0 | | 0 | 83 | 0 |
| X | 0 | 0 | 0 | | 0 | 17 | 0 |
| Rebound coefficient | 0.802 | 0.805 | 0.804 | 0.811 | 0.800 | 0.803 | 0.803 |
| Durability (number of golf balls) | 0 | 0 | 0 | 0 | 10 | 0 | 5 |

As is apparent from the above results, the method for production of a hollow solid golf ball of the present invention can provide a golf ball having a generally perfect spherical hollow portion and the same rebound characteristics and durability as those of a solid golf ball. Regarding the golf balls of Comparative Examples 2 and 4, since bowl-shaped half-shells are bonded using an adhesive, the bonding force at the bonded portion is low and the golf balls are easily broken at the bonded surface at the time of hitting and, the durability is poor. Regarding the golf ball of Comparative Example 3, since two preliminarily molded bowl-shaped half-shells are put together and then vulcanized in a mold, the hollow center is deformed by expansion of the rubber composition for hollow center and therefore the hollow portion does not have a perfect spherical shape. To the contrary, regarding the golf balls of Examples 1 to 3, since two bowl-shaped half-shells, wherein only the hollow portion side is vulcanized and the outer portion is semi-vulcanized, are put together and then bonded in a mold by entire vulcanization, the vulcanized portion of the hollow portion of the bowl-shaped half-shell prevents the deformation of the hollow center in the step of entire vulcanization and, the sphericity of the hollow portion is good. Also, since the vulcanization of the two bowl-shaped half-shells is conducted with the same rubber composition, the bonding strength of the bonded surface is high and the durability of the resulting golf ball is also good.

What is claimed is:

1. A method for producing a golf ball comprising a hollow core having a hollow center containing a hollow portion and a cover formed on the hollow core, wherein the steps of producing the hollow center comprise:

(1) preparing a rubber composition for the hollow center,
   (2) forming bowl-shaped, half-shells from the rubber composition,
   (3) simultaneously or subsequently vulcanizing only the inside of the half-shells,
   (4) bonding two of the half-shells together to form a complete spherical composite structure having a center, hollow portion, and
   (5) simultaneously or subsequently vulcanizing the resulting composite structure.

2. The method of claim 1, wherein at least one intermediate core layer is disposed between the hollow center and the cover.

3. The method of claim 1, wherein the rubber composition is introduced between an outer semi-spherical mold for forming a n outer surface of the hollow center and an inner core mold for defining the hollow portion, and heating the core mold to the vulcanization temperature to form said half-shell in which only the inside of the half-shell is vulcanized.

4. The method of claim 3, wherein said outer spherical mold and said inner core mold are spaced apart from each other for defining the thickness of the walls of the hollow center.

5. The method of claim 1, wherein the rubber composition is preliminarily molded into said bow-shaped half-shell, and a heating means is utilized to heat the surface of the hollow portion to form said bow-shaped half-shell in which only the hollow potion is vulcanized.

6. The method of claim 1, wherein the outer portion of the hollow center disposed around the hollow portion is semi-vulcanized or remains unvulcanized.

7. The method of claim 2, wherein the hollow core comprising the hollow center and the intermediate layer has a wall thickness of 4.0 to 18.0 mm.

8. The method according to claim 1, wherein the vulcanization of the complete spherical body formed from two of the bowl-shaped half-shells is conducted at a temperature of 140 to 170° C. for 10 to 20 minutes.

9. The method according to claim 1, wherein the rubber composition for the hollow center comprises a base rubber, a co-crosslinking agent, a crosslinking agent and a filler.

10. The method according to claim 9, wherein the base rubber is selected from the group consisting of natural rubber, a synthetic rubber, or a mixture thereof.

11. The method according to claim 9, wherein the base rubber is polybutadiene having a cis-1,4 content of not less than 40%.

12. The method according to claim 9, wherein the co-crosslinking agent is a metal salt of an unsaturated carboxylic acid.

13. The method according to claim 9, wherein the crosslinking agent includes an organic peroxide.

14. The method according to claim 9, wherein the filler is selected from the group consisting of zinc oxide, barium sulfate, calcium carbonate, tungsten powder, molybdenum powder and a mixture thereof.

15. The method according to claim 1, wherein the hollow portion of the hollow center has a diameter of 5 to 30 mm.

16. The method according to claim 1, wherein the hollow center has a wall thickness of 4.0 to 18.0 mm.

17. The method according to claim 1, wherein the cover is formed from an ionomer resin.

18. The method according to claim 1, wherein the cover has a thickness of 1 to 4 mm.

19. The method according to claim 1, wherein the vulcanization of the inside of the bowl-shaped half-shell is conducted at a temperature of 140 to 170° C. for 10 to 20 minutes.

* * * * *